Feb. 18, 1941.

E. F. BACON

Re. 21,716

TEMPERATURE INDICATOR

Original Filed Feb. 27, 1935

Inventor
Elbridge F. Bacon

By Blackmore, Spencer & Flint
Attorneys

Reissued Feb. 18, 1941

Re. 21,716

UNITED STATES PATENT OFFICE 21,716

TEMPERATURE INDICATOR

Elbridge F. Bacon, Flint, Mich., assignor to General Motors Corporation, Detroit, Mich., a corporation of Delaware Original No. 2,113,610, dated April 12, 1938, Serial No. 8,426, February 27, 1935. Application for reissue January 26, 1940, Serial No. 315,840

8 Claims. (Cl. 201—63)

This invention relates to temperature indicators and has particular reference to the temperature indicators applied to the internal combustion engines used on automotive vehicles.

Internal combustion engines used on automotive vehicles are customarily supplied with a cooling system in which there is circulated a supply of water to keep the cylinders from overheating. It is desirable to know the temperature of the water in the cooling system for the reason that excessive temperatures of 200° indicate that the water is shortly to reach the boiling point and that the supply of water in the system needs to be replenished. For this reason temperature indicators are used having a dial or signal at the dash board to indicate to the operator when the engine is being overheated or when the liquid in the system needs to be replenished.

In the present invention use is made of an electric circuit having a signal or indicator at the dash board. In the circuit there is placed a resistor unit or plug secured in the engine block in contact with the water of the cooling system so that the unit or plug receives heat from the water. The unit is a part of an electrical circuit and is equipped with a substance which at low temperatures has a relatively high electrical resistance, but at high temperatures, such as 180°–200° or over, has a relatively low resistance. The purpose of this substance is to prevent the operation of the electric circuit when the running conditions of the engine are normal or when the water is at a relatively low temperature such as 150° and below, but which will allow the current to pass through the system to operate a signal at the dash board when the temperatures are high, such as 180° and above. The material or element used is preferably boron.

Figure 1:
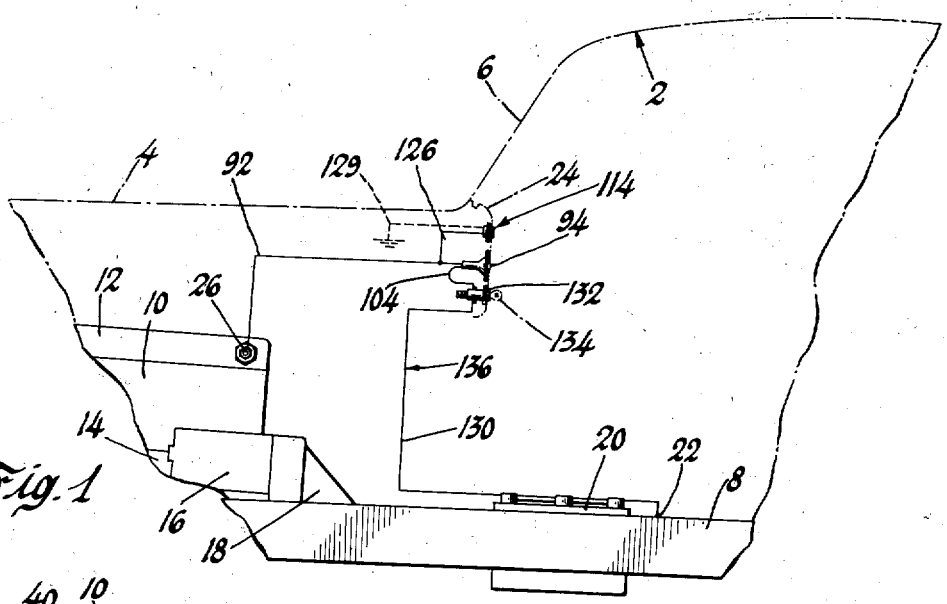
Figure 1 shows a portion of an automobile with the heat indicator installed.

Referring to the drawing, the numeral 2 indicates an automotive vehicle as a whole. The vehicle has the usual hood 4, windshield 6, frame 8, and engine 10. The engine has the usual head 12 and crank case 14. Associated with the engine is the starting motor 16 and driven from the engine is the usual transmission, the housing of which is indicated at 18. The vehicle has the usual electrical battery 20 which is grounded to the frame at 22. The usual instrument board is indicated at 24.

Figure 2:
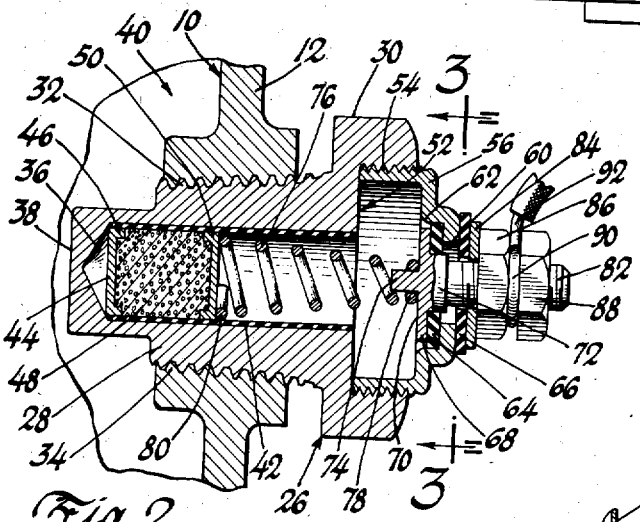
Figure 2 is a section through the unit or plug secured to the engine block.
Figure 3:
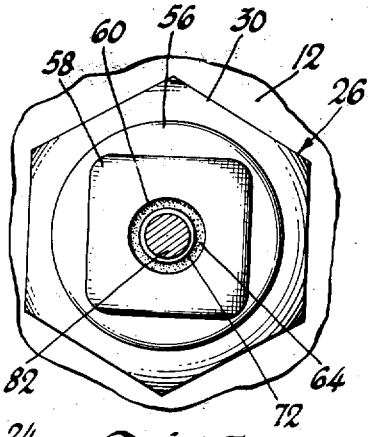
Figure 3 is a section on the line 3—3 of Figure 2.

The resistor unit or plug of the invention is indicated as a whole at 26 and is shown in detail in Figures 2 and 3. The unit comprises the main body portion 28 having the hexagonal head 30 and the threads 32 to enable it to be applied to the corresponding threaded portion 34 in the head 12 of the engine block 10. The body 28 is bored or hollow as indicated at 36 and has the bottom 38 which is in contact with the water of the cooling system, one of the passages of which is indicated at 40.

Interiorly of the bore 36 of the body 28 there is positioned the tube of insulating material 42 which extends the entire length of the bore. At the bottom of the bore there is positioned the circular metal plate or washer 44 having the annular flange 46. Over the plate there is positioned a quantity of boron 48 and over the boron there is positioned a second metal plate 50, a duplicate of the plate 44.

The head 30 of the body 28 has the counterbore 52 in which there is screwthreaded as at 54 the cup 56. The cup 56 has the squared portion 58 provided with an annular opening 60 at its center. The squared portion is shaped to form a recess 62 at the inner portion of the cup 56. In the recess 62 there is received the electric insulation 64 and on the outside of the squared portion there is applied the electric insulation 66 in the form of a square washer. A retaining member 68 in the form of a bolt is applied from the inside of the cup 56 so that the bolt head 70 abuts against the insulation 64 but is out of contact with the cup. An enlarged portion 72 on the bolt closely fits into a corresponding opening in the insulating washer 64.

A projection 74 extends from the center of the head 70 toward the bore 36 of the body 28, and a spring 76 having a small end 78 adjacent the projection 74 extends from around the projection to the washer 50 where the large end 80 of the spring contacts the washer 50 to form an electrical circuit from the washer 44 through the boron 48, washer 50, spring 76, and head 70 to the exterior or threaded end 82 of the bolt 68.

The usual metallic washer 84 is applied over the insulation 66 and a nut 86 is threaded on the threaded shank 82 rigidly and tightly to secure the parts together. A second nut 88 is threaded on the shank 82 and rigidly clamps between the two nuts the end or terminal 90 of a wire 92 of the electrical circuit.

Figure 4:
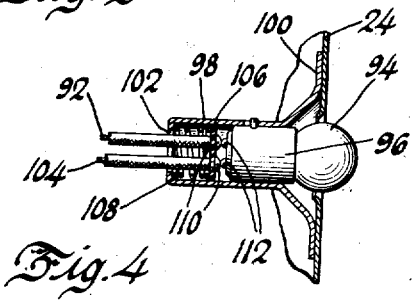
Figure 4 is a section through the dash board showing the signal at the dash.

Referring to Figure 4, it will be seen that the signal is in the form of a lamp 94, but if desired an audible signal such as a bell or buzzer could be used. The lamp is secured in the usual lamp socket 96 which is held in a suitable thimble 98 secured by means of a flange 100 to the dash board 24. The thimble is open at its inner end as indicated at 102 to allow for the passage of the wires 92 and 104. The ends of the wires are suitably secured to a piece of insulation 106, and a spring 108 between the bottom of the thimble and the insulation 106 always urges the terminals 110 of the wires toward the terminals 112 of the lamp.

Figure 5:
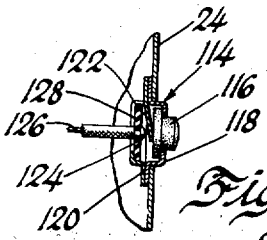
Figure 5 is a section through the dash board showing the switch to operate the signal of Figure 4.

Referring to Figure 5, there is shown a conventional type of testing switch 114. This switch has the push button 116 mounted in the housing 118 secured to the dash board 24 by means of the flange 120. A contact spring 122 always urges the push button 116 to the position shown in Figure 5 or away from the contact 124 and wire 126. The terminal 124 is held in the housing 118 by means of the insulating washer 128. A wire 129 leads from the switch 114 to ground.

Referring to Figure 1, it will be seen that the circuit from the battery 20 includes the wire 130 which leads to the ignition switch 132, the key of which is indicated at 134. The circuit is therefore open or closed depending on whether the ignition is open or closed, respectively. From the ignition switch 132 the wire 104 leads to the signal 94 and from the signal the wire 92 leads to the unit 26, the body of which is grounded to the frame through the engine block 10. It is therefore apparent that the signal 94 is not distinguishable at the dash unless the circuit indicated as a whole at 136 is closed through the unit 26 in the engine block. At lower temperatures of the water in the cooling system the resistance of the boron 48 is too great to allow sufficient current to pass through the circuit properly to illuminate the signal 94. However, when higher temperatures are reached such as temperatures 180° or higher, sufficient current will pass through the boron to iluminate the light 94, and when temperatures as high as 212°, or the boiling point of water, are reached, the resistance of the boron will be very low, such as approximately 2 ohms, so that the light 94 is brightly illuminated.

The boron 48 is not a pure boron owing to its cost and the difficulty of obtaining it. The boron is of an impure type or may have mixed therewith a certain quantity of aluminum, copper, or graphite to increase its conductivity. Pure boron oxidizes too readily and for this reason amorphous boron, which can be produced from a reduction process from boric acid, is used. A resistor formed by assembling powdered boron with gilsonite under considerable pressure forms a satisfactory product to use in the resistor unit 26. Resistor units having 150 ohms resistance at room temperature and a very low resistance at high temperatures can be formed in this manner.

Instead of the light 94 (or a bell) a differential galvanometer or gauge such as shown in my Patents 1,791,786, February 10, 1931 and 1,942,529, January 9, 1934, may be used. With a gauge of this type, the pointer will indicate a plurality of temperatures, the position of the needle over the scale being determined by the amount of current passing through the boron. The electrical resistance of the boron will depend on its temperature, and by suitably changing, calibrating and/or proportioning the gauge or galvanometer coils to suit the range of resistance changes in the boron, the dial or scale of the gauge can be accurately divided properly to indicate the water temperature. The advantage of the gauge of my prior patents is that it gives a plurality of readings instead of one, as will be the case with the light or bell.

I claim:

1. In a thermal resistor unit, a hollow resistor plug having a portion thereof in contact with the medium the thermal condition of which is to be determined, a quantity of boron in the plug, said boron being out of contact with the medium, means electrically to insulate said boron from the plug, and electrically conductive means at the ends of the quantity of boron to confine the boron and to complete an electric circuit therethrough.

2. In a thermal resistor unit, a hollow resistor plug having a portion thereof in contact with the medium the thermal condition of which is to be determined, a quantity of boron in the plug, said boron being out of contact with the medium, means electrically to insulate said boron from the plug, electrically conductive means at the ends of the quantity of boron to confine the boron and to complete an electric circuit therethrough, a cup secured in one end of the plug, and an electrically conductive spring between the cup and said electrically conductive means.

3. In a thermal resistor unit for application to a temperature indicating system, an integral imperforate hollow plug closed at one end and open at the other, said plug adapted to be secured in position on the device having the medium the temperature of which is to be determined, the closed end of said plug being inside the device and the open end outside thereof, thermal responsive means in the bottom of the plug at the closed end responsive to changes in temperature to enable an electric current to pass therethrough, means to insulate said thermal means from the plug, a removable cap in the open end of the plug closing the open end, an electric contact secured to the cap, means to insulate the contact from the cap, and a compressed coil spring in the plug extending between the contact and the thermal responsive means in the plug end and in electrical contact with both, to enable an electric current to pass through the plug at higher temperatures.

4. In a thermal resistor unit for application to a temperature indicating system, an integral imperforate hollow plug closed at one end and open at the other, said plug adapted to be secured in position on the device having the medium the temperature of which is to be determined, the closed end of said plug being inside the device and the open end outside thereof, thermal responsive means in the bottom of the plug at the closed end responsive to changes in temperature to enable an electric current to pass therethrough, metallic electrically conducting plates at the ends of said thermal responsive means, means electrically to insulate one of said plates and said thermal responsive means from the plug, a removable cap in the open end of the plug closing the open end, an electric contact secured to the cap, means to insulate the contact from the cap, and a compressed coil spring in the plug extending between the contact and the insulated plate in the plug end and in electrical contact with both, to enable an electric current to pass through the plug at higher temperatures.

5. In a thermal resistor unit, a hollow resistor plug having a portion thereof in contact with the medium the thermal condition of which is to be determined, a quantity of boron in the plug, said boron being out of contact with the medium, means electrically to insulate said boron from the plug, and electrically conductive means contacting with the boron to complete an electrical circuit therethrough.

6. In a thermal resistor unit, a hollow resistor plug having a portion thereof in contact with the medium the thermal condition of which is to be determined, a quantity of boron in the plug, said boron being out of contact with the medium, means electrically to insulate said boron from the plug, electrical conducting members at both ends of the boron to hold the boron in place, and a spring between one of the members and one end of the plug to complete an electrical circuit.

7. In a thermal resistor unit for application to a temperature indicating system, an integral imperforate hollow plug closed at one end and open at the other, said plug adapted to be secured in position on the device having the medium the temperature of which is to be determined, the closed end of said plug being inside the device and the open end outside thereof, thermal responsive means in the bottom of the plug at the closed end responsive to changes in temperature to change its resistivity to enable a greater or less amount of electric current to pass therethrough, means to insulate said thermal means from the plug, a cap at the open end of the plug closing the open end, an electric contact secured to the cap, means to insulate the contact from the cap, and a compressed spring in the plug extending between the contact and the thermal responsive means in the plug end and in electrical contact with both, to enable an electric current to pass through the plug at higher temperatures.

8. In a thermal resistor unit for application to a temperature indicating system, an integral imperforate hollow plug closed at one end and open at the other; said plug adapted to be secured in position on the device having the medium the temperature of which is to be determined, the closed end of said plug being inside the device and the open end outside thereof, thermal responsive means in the bottom of the plug at the closed end responsive to changes in temperature to change its resistivity to enable a greater or less amount of electric current to pass therethrough, metallic electrically conducting plates at the ends of said thermal responsive means, means electrically to insulate one of said plates and said thermal responsive means from the plug, a cap at the open end of the plug closing the open end, an electric contact secured to the cap, means to insulate the contact from the cap, and a compressed spring in the plug extending between the contact and the insulated plate in the plug end and in electrical contact with both, to enable an electric current to pass through the plug at higher temperatures.

ELBRIDGE F. BACON.